Patented Jan. 31, 1933

1,895,733

UNITED STATES PATENT OFFICE

SAMUEL RUOSCH, OF VISP, SWITZERLAND, ASSIGNOR TO FIRM: LONZA ELEKTRIZITATS-WERKE UND CHEMISCHE FABRIKEN AKTIENGESELLSCHAFT, OF GAMPEL AND BASEL, SWITZERLAND

PREPARATION OF MIXED MANURES CONTAINING AMMONIUM NITRATE

No Drawing. Application filed August 3, 1931, Serial No. 554,951, and in Switzerland August 10, 1930.

The use hitherto of ammonium nitrate as a manure has involved considerable difficulties, which are in part due to the rapid caking together and the hygroscopic nature of the salt. Further, the high nitrogen content hinders the direct use of this manure in agriculture. It has therefore often been proposed to transform ammonium nitrate into a form which keeps well, does not cake and is easily scatterable, by admixture of suitable substances.

One such process is based on mixing ammonium nitrate dry with gypsum. Another proposal aiming at the above mentioned end was to mix solid ammonium nitrate with ground limestone.

It has been found, however, that the manures obtained by simple intermixture of the solid dry ingredients still cake together when stored, and easily become demixed or powder when strewn. Further the mixed products hitherto produced from calcium carbonate and ammonium nitrate have been found not completely stable, as in the course of time they gradually liberate ammonia through double decomposition.

It has also been attempted to prepare mixed manures containing ammonium nitrate by adding calcium carbonate to molten ammonium nitrate and allowing the melt to solidify, for example on a cooling roller or by spraying. These methods of preparation always require an after-treatment of the product because the grains after this working process solidify superficially so rapidly that not all the water and ammonia contained in them is evaporated or driven off. Accordingly there always remains a certain amount of water in the interior of the grains, which during prolonged storage favours reaction between the ammonium nitrate and the calcium carbonate, which leads to the above mentioned difficulties.

In order to overcome these faults it has already been proposed to subject the product obtained by allowing the melt to solidify on cooling rollers or by spraying, to a special after-treatment for example by drying it in a vacuum at 50–100° C. or by subsequent treatment in a rotary tube furnace at raised temperature, lying however below the melting point of the product.

In contradistinction to these known processes, the present invention makes it possible by a single process to obtain an entirely odourless product of uniform composition which does not cake with prolonged storage and even in taking up atmospheric moisture over a prolonged period liberates no ammonia. The process is based on the discovery that the partial transformation into calcium nitrate and ammonium carbonate, or into $CO_2$, $NH_3$ and $H_2O$ occurring when calcium carbonate is added to molten ammonium nitrate depends mainly upon the temperature and the water content of the melt.

Based upon this discovery, the present process consists in subjecting a melt obtained by mixing a hot, concentrated, preferably 95%, solution of ammonium nitrate with calcium carbonate from any source, to a cooling process in the same operation, only at such a speed that the crystallization heat can be used for as great as possible evaporation of the water originally present in the melt and formed by reaction and for driving off the free ammonia formed by the partial reaction.

With this process there does not occur a violent surface quenching as with the above mentioned roller cooling or spraying process which makes the driving off of the ammonia and water difficult.

The products obtained by the above described process form without after-treatment an entirely odourless, non-hygroscopic and non-caking mixed manure, which even with prolonged storage liberates practically no ammonia.

Example 300 parts of 95% ammonium nitrate and 378 parts of finely powdered dry limestone are intimately mixed together in a heating mixing apparatus and the melt at about 120–130° C. solidified by a but moderately fast cooling process in a mixing apparatus with strong mixing arms which ensures an intimate mixing of the reaction mass. The solidified, completely odourless and dry reaction mass is brought to the desired grain size by suitable grinding and sifting. The finished product has a total nitrogen content of 15-16% and forms an absolutely odourless, storable and strewable manure.

By varying the proportions in which the raw materials are mixed, products with greater nitrogen content, for example with 20% of nitrogen, can be prepared by the above described process, which have the same good properties.

In place of limestone, precipitated calcium carbonate, as is obtained for example in the preparation of ammonium sulphate from gypsum, ammonia and carbon dioxide, can be used.

What I claim is:—

A process for preparing mixed manures containing ammonium nitrate by mixing hot concentrated ammonium nitrate solutions having a water content of about 5 per cent with calcium carbonate from any source, in molten condition, consisting in subjecting the melt in one and the same operative phase to a slow cooling and to a dewatering and degasifying operation without supply of heat and while so restraining the delivery of heat that the crystallization heat may suffice for as great as possible evaporation of the water originally in the melt and formed by reaction as well as for driving off the free ammonia formed by the partial reaction.

In witness whereof I have hereunto signed my name this 22nd day of July, 1931.

SAMUEL RUOSCH.